US007085742B2

(12) United States Patent
Ho et al.

(10) Patent No.: US 7,085,742 B2
(45) Date of Patent: Aug. 1, 2006

(54) AUTHENTICATING SOFTWARE LICENSES

(75) Inventors: Raymond Ho, North York (CA); Edward Fung, North York (CA)

(73) Assignee: Xybo Systems, Inc., Markham (CA)

( * ) Notice: Subject to any disclaimer, the term of this patent is extended or adjusted under 35 U.S.C. 154(b) by 503 days.

(21) Appl. No.: 10/003,538

(22) Filed: Oct. 30, 2001

(65) Prior Publication Data
US 2002/0073325 A1 Jun. 13, 2002

Related U.S. Application Data

(60) Provisional application No. 60/243,718, filed on Oct. 30, 2000.

(51) Int. Cl.
*G06F 9/30* (2006.01)
*G06F 17/60* (2006.01)
*H04L 9/02* (2006.01)
*H04L 9/00* (2006.01)

(52) U.S. Cl. .............................. 705/57; 705/51; 380/46; 380/4; 380/21; 713/176; 713/189

(58) Field of Classification Search ................. 705/57, 705/51; 380/4, 21, 46; 713/176, 189
See application file for complete search history.

(56) References Cited

U.S. PATENT DOCUMENTS 5,276,738 A * 1/1994 Hirsch .......................... 380/46

6,308,256 B1 * 10/2001 Folmsbee ................... 712/209

OTHER PUBLICATIONS

Controlling copyright infringements of intellectual property: The case of computer software—Part two. Malhotra, Yogesh—Journal of Systems Management v45n7 pp.: 12-17 Jul. 1994—ISSN: 0022-4839 JRNL CODE: JSM.*
JP20041715004 Nov. 15, 2002, Unauthorized-use prevention for software program, transmits authentication password to user, based on computer indentificatioon information received by program management traders.*

* cited by examiner

*Primary Examiner*—James P. Trammell
*Assistant Examiner*—Daniel L. Greene
(74) *Attorney, Agent, or Firm*—McCormick, Paulding & Huber LLP

(57) ABSTRACT

A method and an apparatus for using an encrypted unique digital signature ("engraved signature") as a uniquely definable signature to control the use or execution of software in a computer system. The computer system has a Network Interface Card ("NIC") with a Media Access Control ("MAC") address. On start up, the engraved signature is retrieved from the persistent storage medium of the computer system and the MAC address is retrieved from the NIC. A computed encrypted signature is generated using the MAC address. Where the computed encrypted signature does not match the engraved signature, the execution of the software is halted.

14 Claims, 5 Drawing Sheets

AUTHENTICATING SOFTWARE LICENSES

CROSS-REFERENCE TO RELATED APPLICATION

This application is related to and claims the benefit of U.S. provisional application entitled AUTHENTICATING SOFTWARE LICENSES having Ser. No. 60/243,718, by Raymond HO and Edward FUNG, filed on Oct. 30, 2000 and incorporated by reference herein.

FIELD OF THE INVENTION

This invention relates to software licenses and in particular to authentication and enforcement of software licenses in computer systems.

BACKGROUND OF THE INVENTION

Software in a computer system may be distributed in a number of ways. From the perspective of preventing unauthorized use, these distribution methods may be classified into three groups, namely, unrestricted entitlement, restricted entitlement, and non-entitlement methods.

Unrestricted entitlement means that the software distributed with a computer system will run on any computer system for which it was designed, without any restrictions. Apart from the licensing and contractual agreement, there is nothing in the software to guard against unauthorized use. This method is not desirable for expensive software.

Restricted entitlement means that the software contains some means to limit itself to run only on the computer system for which it is authorized. A common restriction method is to encode hardware specific information in the computer system so that the software can verify the information at system startup. Another method is to make the software unique for every computer system. This entails unique compilation of the software for each distribution, which is a very costly operation.

Non-entitlement means that the software is disabled when distributed, and requires a separate authorization method to enable the software. This method is commonly adopted in computer systems where a single generic distribution medium is used to distribute all of the software, and software components or packages within may be enabled or disabled according to license contract.

It is widely believed to be very difficult, if not impossible, to design a software protection method that cannot be defeated over the long run. It would be advantageous to devise a protection method that would reduce the incentive for a potential counterfeiter to counterfeit the system, thereby achieving the objective of protecting the software from software piracy.

The problem of software piracy is acute with a particular class of computer systems, namely Internet Appliances. An Internet Appliance is generally a computer system that performs some predetermined functions while connected to the Internet. The Internet Appliances typically consist of computer hardware with embedded software. The hardware includes a storage medium and a network interface card.

Software embedded in an Internet Appliance tends to be compact. It is not uncommon to store the entire system software in a storage medium that has only a few megabytes of capacity. This type of storage medium is usually small and very portable (such as CompactFlash and SIM cards). Because of wide adaptation and portability of such media, digital content inside such mediums media can be illegally duplicated very easily.

It is therefore an aspect of an object of the present invention to provide a method and an apparatus for protecting the embedded software in computer systems, such as Internet Appliances, against unauthorized use, while being relatively cost-effective to deploy.

An aspect of another object of this invention is to provide a method and an apparatus for protecting the software in a computer system, while allowing a user to make legitimate backup copies of the software.

An aspect of another object of this invention is to provide a method and an apparatus for a user to quickly re-entitle the software in a computer system in the event that the software enters a non-entitlement state.

SUMMARY OF THE INVENTION

According to an aspect of the present invention, there is provided a method and an apparatus for using an encrypted unique digital signature ("engraved signature") as a uniquely definable signature to control the use or execution of software in a computer system. The computer system has a Network Interface Card ("NIC") with a Media Access Control ("MAC") address. On start up, the engraved signature is retrieved from the persistent storage medium of the computer system and the MAC address is retrieved from the NIC. The MAC address is unique according to industry standards and therefore uniquely identifies the NIC being used in the computer system. A computed encrypted signature is generated using the MAC address and compared with the retrieved engraved signature. Where the computed encrypted signature does not match the engraved retrieved signature, the execution of the software is halted.

According to another aspect of the present invention, the MAC address is encrypted using a one-way encryption algorithm where the encryption key used to perform the encryption is different from the decryption key used to perform the decryption.

According to a further aspect of the present invention, there is provided a method of storing an engraved signature into a persistent storage medium by initializing the medium with a blank signature, preferably during the software reproduction process. The blank signature is a unique predefined pattern of binary code. During system startup, the software protection program checks to determine if the signature in the medium is blank or not. If blank, the protection software computes an encrypted signature based on the MAC address of the NIC in the computer system. The computed encrypted signature is stored in the persistent storage medium as the engraved signature for future authentication. Preferably, this process of engraving the signature is done once at the premises of a manufacturer before the computer system is shipped to the user.

Thus, users may back up the protected software without restriction as the engraved signature restricts the copies of the software from being used in unauthorized computer systems.

DETAILED DESCRIPTION OF THE PREFERRED EMBODIMENTS

Figure 1:
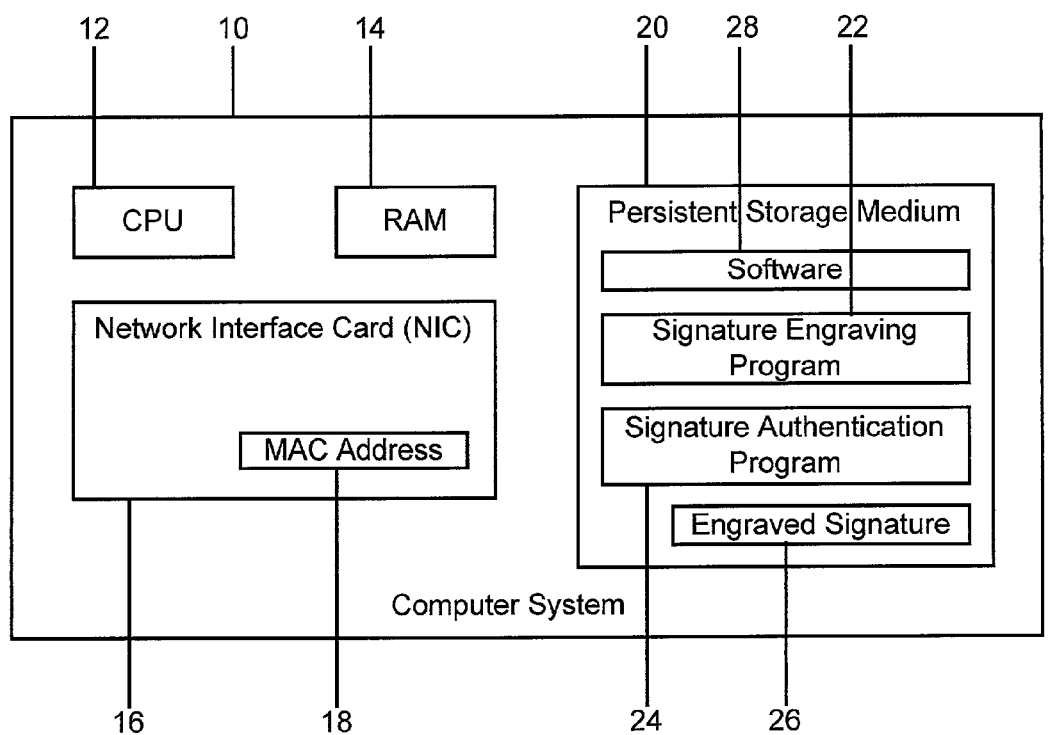
FIG. 1 is a block diagram of a software protection program having an engraved signature for protecting software of a computer system according to an embodiment of the present invention.

Referring to FIG. 1, there is shown a block diagram of a software protection program for a computer system 10 according to an embodiment of the present invention. The computer system 10 comprises a central processing unit (CPU) 12, a random access memory (RAM) module 14, network interface card (NIC) 16 embedded with a unique Media Access Control (MAC) address 18 that can be read electronically, and a persistent storage medium 20. The NIC 16 can be an external adaptor card or part of an onboard chip set. The persistent storage medium 20 contains the system software for the computer system 10, plus software 28 protected by the software protection program. The software protection program comprises a signature engraving program 22, a signature authentication program 24 and an engraved signature 26.

The engraved signature 26, which is a 128-bit binary code, is stored in the persistent storage medium 20 as a 32-byte hexadecimal character string where every byte (8 bits) of the engraved signature is represented by 2 hexadecimal characters. The initial digital code of the engraved signature 26 is blank. A blank signature 26 is a predefined code pattern, the value of which is arbitrarily defined, but which value should not be the same as a signature computed from a MAC address.

The MAC address 18 embedded in the NIC 16 is a unique hardware identifier specified by the NIC hardware manufacturer. MAC addresses on all NICs are unique as per industry standard. The MAC address 18 is a 48-bit binary code created and encoded by the NIC manufacturer and is readable by the software running in the computer system 10. The MAC address 18 of the computer system 10 is used to generate a computed encrypted signature. The A non-blank engraved signature 26 is an encrypted signature based on one authorized MAC address.

The signature authentication program 24 authenticates software by comparing the computed encrypted signature by comparing it with the engraved signature 26. The software 28 is authorized or authenticated where the computed encrypted signature matches the engraved signature 26. The program 24 is preferably executed during the system start-up so that unauthorized use of the software 28 is detected as soon as possible, but the program 24 may also be executed at any time when the computer system 10 is running.

The engraved signature 26 is fabricated using unique hardware identification of the MAC address 18 by means of encryption. The publicly available algorithm called Block Cipher SQUARE encryption method is used to generate the engraved signature. Details of this encryption method can be found in the published research paper by Joan Daemen, Lars Knudsen, and Vincent Rijmen. entitled "The Block Cipher Square", Eli Biham, editor, Fast Software Encryption —97, volume 1267 of Lecture Notes in Computer Science, pages 149–165, Haifa, Israel, January 1997, Springer-Verlag.

The Block Cipher Square encryption method is a one-way encryption method where the encryption key used to perform encryption is different from the key used to perform decryption. Only the encryption method is required and used in accordance with this invention. It will however be understood by those skilled in the art that other encryption methods may also be used without departing from the scope of this invention.

The encryption method encodes and decodes 128-bit binary numbers. The encryption method is a 2-step process in which an encryption key is generated in a first step and is used by in the second step to create the encrypted data. The MAC address 18 is only a 48-bit code. The rest of the 80-bit code is arbitrarily assigned to complete the 128-bit code input required by the encryption method. The 80-bit code is hard coded into the software protection program.

Figure 2:
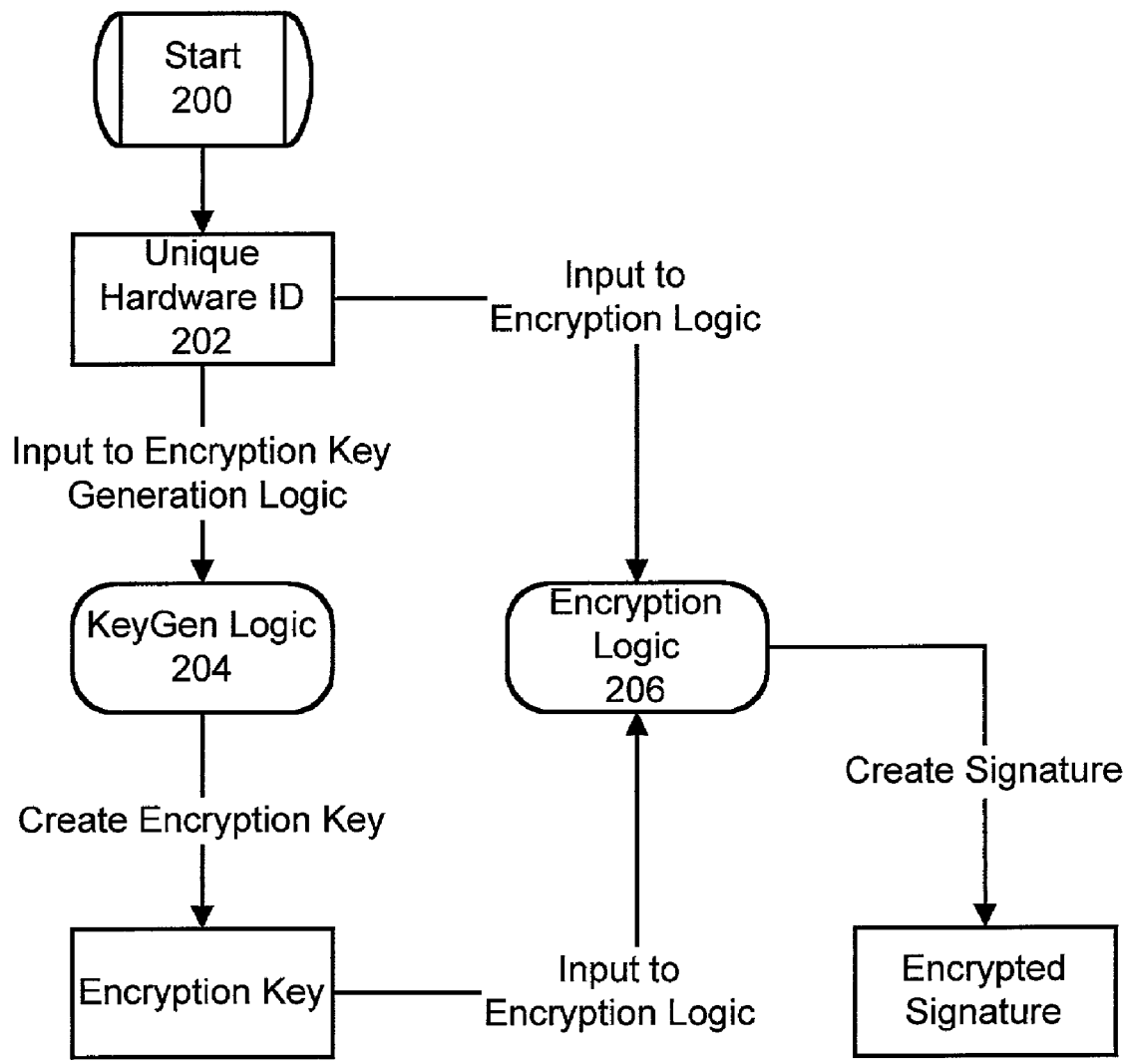
FIG. 2 is a flowchart of the steps of generating an encrypted signature for the computer system of FIG. 1.

Referring to FIG. 2, there is shown a flowchart of the steps for generating an encrypted signature 26 for the computer system 10 of FIG. 1. At step 200, the MAC address 18 is read then, at step 202, the 48-bit MAC address 18 is combined with the 80-bit code to yield a unique hardware ID. An encryption key is created using the unique hardware ID by a key generation ("KeyGen") logic component of the software protection program (step 204). The encrypted signature is then created by encrypting the unique hardware ID using the encryption key (step 206). The encrypted signature is the computed encrypted signature used by the signature authentication program 24 for authentication purposes, and forms the engraved signature 26 when the encrypted signature is created by the signature engraving program 22.

Figure 3:
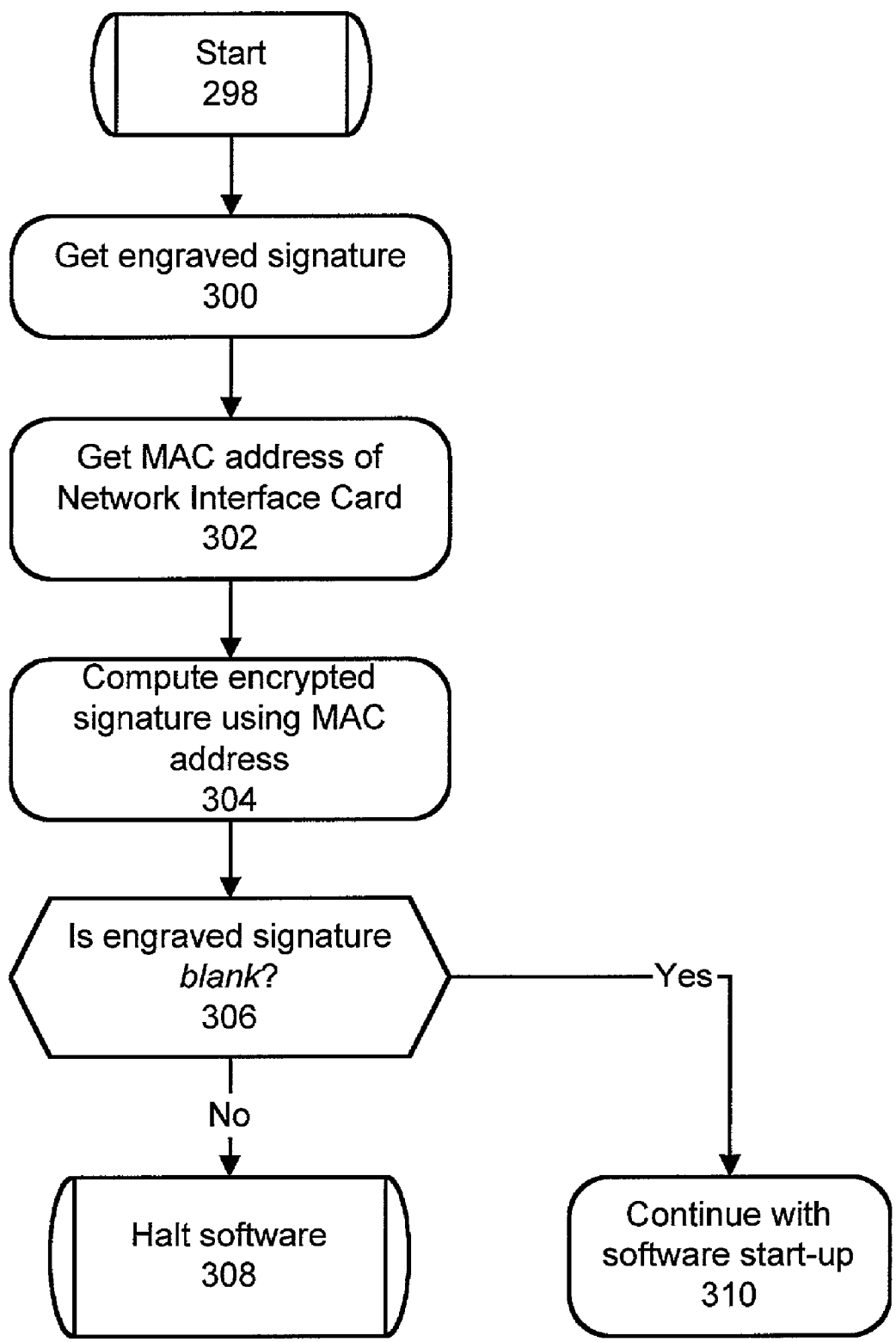
FIG. 3 is a flowchart of the steps to authenticate the computer system for a license to the software according to the software protection program of FIG. 1.

Referring to FIG. 3, there is shown a flowchart of the steps to provide the computer system 10 with a license for the software 28 according to the software protection program of FIG. 1. At step 298, the signature authentication program 24 is started upon execution of the software 28. At step 300, the engraved signature 26 is read from the persistent storage medium 20 and stored in RAM 14 for use during later steps. At step 302, the MAC address 18 is read from the Network Interface Card 16 and then, at step 304, the computed encrypted signature is generated by encrypting the MAC address 18. At step 306, the computed encrypted signature is compared to the engraved signature 26. If No, the computed encrypted signature does not match with the engraved signature 26, then the execution of the software 28 is halted (step 308). If Yes, the computed encrypted signature matches the engraved signature 26, then the execution of the software 28 continues (step 310).

Where the software 28 is the operating system of the computer system 10, the operation of the computer system 10 is thus halted on boot up if the computed encrypted signature does not match the engraved signature 26.

Figure 4:
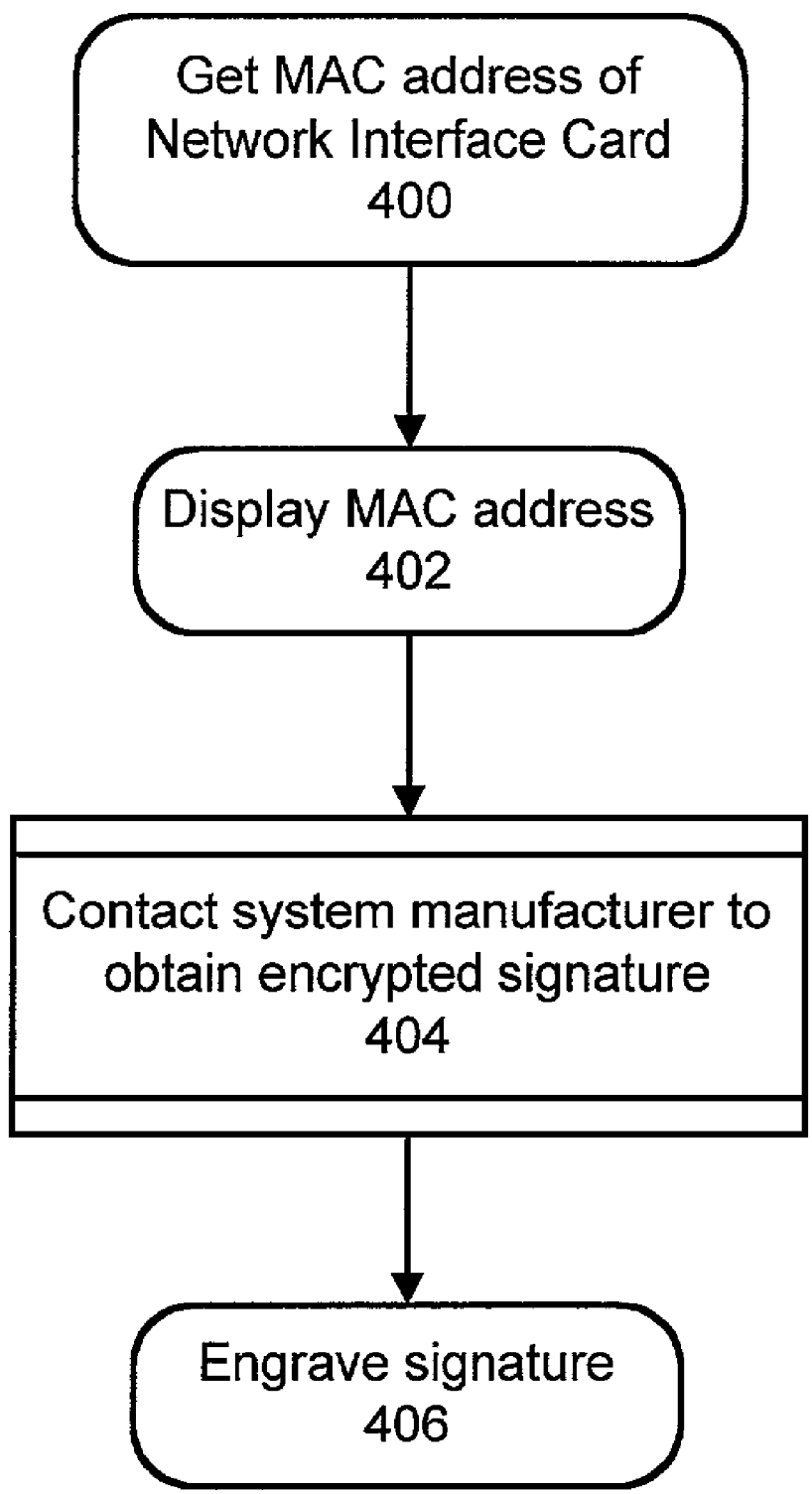
FIG. 4 is a flowchart of the steps to set up the software protection program with the engraved signature of FIG. 1.

Referring to FIG. 4, there is shown a flowchart of the steps to set up the software protection program with the engraved signature 26 of FIG. 1. At step 400, the MAC address 18 is read from the Network Interface Card 16 and, at step 402, the MAC address 18 is displayed to a user. The user then contacts the licensor of the software 28, provides the MAC address 18, and obtains a signature there from (step 404). The licensor uses the MAC address 18 to generate the computed encrypted signature for the user. The computed encrypted signature from the licensor is then saved by the user and stored as the engraved signature 26 (step 406).

The steps of FIG. 4 may be used as a non-entitlement means for enabling the software 28. Further, if for any reasons the engraved signature 26 in the persistent storage medium 20 becomes corrupted, then the steps of FIG. 4 may also be used to re-setup the engraved signature 26.

Figure 5:
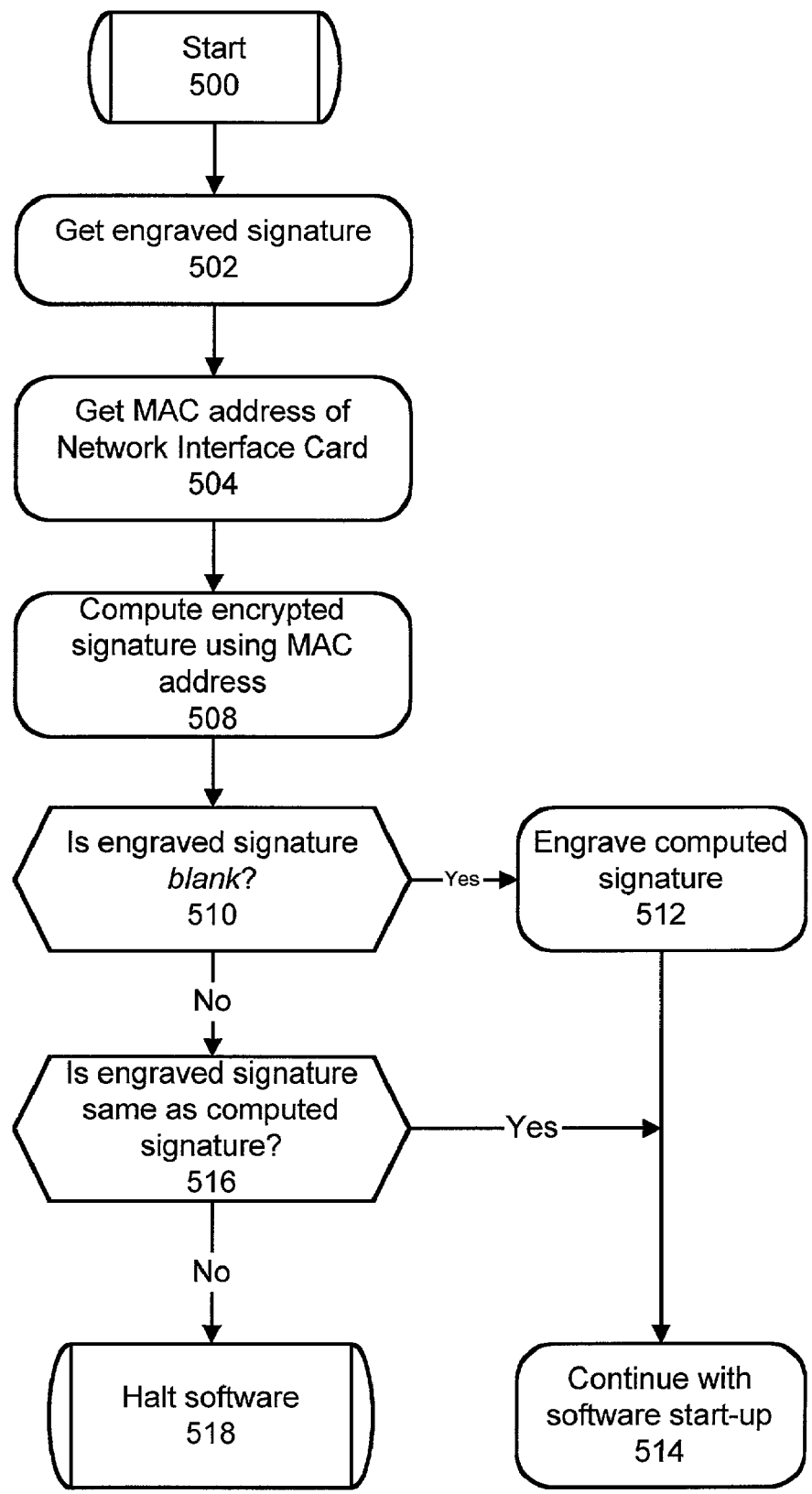
FIG. 5 is a flowchart of the steps to automatically set up the software protection program with the engraved signature of FIG. 1.

Referring to FIG. 5, there is shown a flowchart of the steps to automatically set up the software protection program with the engraved signature 26 of FIG. 1. At step 500, the signature authentication program 24 is started upon the execution of the software 28. At step 502, the engraved signature 26 is read from the persistent storage medium 20 and stored in RAM 14 for use during later steps. At step 504, the MAC address 18 is read from the Network Interface Card 16 and then, at step 508, the computed encrypted signature is generated by encrypting the MAC address 18. At step 510, the engraved signature 26 is compared to determine if it is a blank signature. If Yes, the engraved signature 26 is a blank signature, then, at step 512, the signature engraving program 22 engraves or stores the computed encrypted signature in the persistent storage medium 20 as the engraved signature 26. In this case, execution of the software 28 continues (step 514). At step 512, the software protection program may disable or erase the signature engraving program 22 after one engraving for greater security.

If at step 510, the engraved signature 26 does not match the blank signature, then, at step 516, the computed encrypted signature is compared to the engraved signature 26. If No, the computed encrypted signature does not match with the engraved signature 26, then the execution of the software 28 is halted (step 518). If Yes, the computed encrypted signature matches the engraved signature 26, then the execution of the software 28 continues (step 514).

When the software protection program is run for the first time after the software protection program is reproduced from a master copy, the engraved signature 26 has the blank signature. Thus, this process of engraving a signature is preferably done by the computer system manufacturer during system integration, but it can also be done at other times and by other parties.

The computed signature that is stored as the engraved signature may further be encrypted using another one-way encryption method. In this embodiment, the computed signature is encrypted using an encryption key of said another the other one-way encryption method by, for example, the manufacturer of the computer system during system integration. The signature authentication program only needs a decrypting key to read the engraved signature. In this manner, greater security can be achieved as the encryption key of said another one-way encryption method is not otherwise on the computer system.

It will be understood by those skilled in the art that other signatures in the computer system can be used for the same purpose, as identifiers, whether unique or mostly unique to the particular computer systems. The other signatures include the serial number of CPUs, hard drive format code numbers, code number of computer system "add-ons", or a combination of these signatures to form unique signatures. Mostly unique means that the identifier used is sufficient for authentication purposes even though it is not unique for some computer systems.

Although preferred embodiments of the invention have been described herein, it will be understood by those skilled in the art that variations may be made thereto without departing from the spirit of the invention or the scope of the appended claims.

What is claimed is:

1. An article comprising:
   a computer-readable signal-bearing medium including a software application;
   the medium including an associated engraved signature, the engraved signature being initially blank such that the software application is initially used on one of a plurality of computer systems but once used on a computer system is authenticated for that particular computer system;
   the medium further including an authentication program for authenticating the software application for use on the computer system;
   during execution of the software application, the authentication program for reading the engraved signature and,
   if the engraved signature is not blank then the authentication program performing the following:
     retrieving the identifier from the computer system;
     encrypting the identifier using an encryption method to obtain a computed signature;
     comparing the computed signature to the engraved signature; and
   inhibiting execution of the software application if the computed signature does not match the engraved signature; and
   if the engraved signature is blank, then performing the following:
     retrieving the identifier from the computer system;
     encrypting the identifier using the encryption method to obtain a computed signature; and
       storing the computed signature as the engraved signature thereby generating the engraved signature at the computer system on which the software application is being executed and authenticating the software application only for that computer system.

2. The article of claim 1, wherein the encryption method is called a Block Cipher SQUARE encryption method.

3. The article of claim 1, further wherein the authentication program decrypts the engraved signature before comparing with the computed signature where the engraved signature has been encrypted.

4. The article of claim 1, wherein the identifier comprises at least one of a MAC address of a Network Interface Card, a serial number of a CPU, a hard drive format code number, and a code number of computer system "add-ons".

5. A method of authenticating a software application loaded on a computer system having an identifier associated therewith, the software application including an associated engraved signature, the engraved signature being initially blank such that the software application is initially be used on one of a plurality of computer systems but once used on a computer system is authenticated for that particular computer system, the method comprising the steps of:
   during execution of the software application, reading the engraved signature;
   if the engraved signature is not blank, then performing the following:
     retrieving the identifier from the computer system;
     encrypting the identifier using an encryption method to obtain a computed signature;
     comparing the computed signature to the engraved signature; and
     inhibiting execution of the software application if the computed signature does not match the engraved signature; and
   if the engraved signature is blank, then performing the following:
     retrieving the identifier from the computer system;
     encrypting the identifier using the encryption method to obtain a computed signature; and storing the computed signature as the engraved signature thereby generating the engraved signature at the computer system on which the software application is being executed and authenticating the software application only for that computer system.

6. The method of claim 5, wherein the encryption method is called a Block Cipher SQUARE encryption method.

7. The method of claim 5, further comprising the step of decrypting the engraved signature before comparing with the computed signature where the engraved signature has been encrypted.

8. The method of claim 7, wherein the step of decrypting the engraved signature includes using another encryption method.

9. The method of claim 5, wherein the identifier comprises at least one of a MAC address of a Network Interface Card, a serial number of a CPU, a hard drive format code number, and a code number of computer system "add-ons".

10. A software protection system comprising:
   a computer system having an identifier;
   a software application loaded on said computer system and including an associated engraved signature, the engraved signature being initially blank such that the software application is initially used on one of a plurality of computer systems but once used on a computer system is authenticated for that particular computer system;
   an authentication program executed by the computer system for authenticating the software application, during execution, the authentication program reading the engraved signature and;
   if the engraved signature is not blank then performing the following:
   retrieving the identifier from the computer system;
   encrypting the identifier using an encryption method to obtain a computed signature;
   comparing the computed signature to the engraved signature; and
   inhibiting execution of the software application if the computed signature does not match the engraved signature; and
      if the engraved signature is blank then performing the following:
   retrieving the identifier from the computer system;
   encrypting the identifier using an encryption method to obtain a computed signature; and
   storing the computed signature as the engraved signature thereby generating the engraved signature at the computer system on which the software application is being executed and authenticating the software application only for that computer system.

11. The system of claim 10, wherein the encryption method is called a Block Cipher SQUARE encryption method.

12. The system of claim 10, wherein the authentication program decrypts the engraved signature before comparing the engraved signature with the computed signature where the engraved signature has been encrypted.

13. The system of claim 12, wherein the engraved signature has been encrypted and decrypted using another encryption method.

14. The system of claim 10, wherein the identifier comprises at least one of a MAC address of a Network Interface Card, a serial number of a CPU, a hard drive format code number, and a code number of computer system "add-ons".

* * * * *